(12) United States Patent
Lyon et al.

(10) Patent No.: US 6,427,188 B1
(45) Date of Patent: Jul. 30, 2002

(54) METHOD AND SYSTEM FOR EARLY TAG ACCESSES FOR LOWER-LEVEL CACHES IN PARALLEL WITH FIRST-LEVEL CACHE

(75) Inventors: Terry L Lyon, Fort Collins; Eric R DeLano, Ft Collins, both of CO (US); Dean A. Mulla, Saratoga, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/501,396

(22) Filed: Feb. 9, 2000

(51) Int. Cl.$^7$ ............................................... G06F 12/00
(52) U.S. Cl. ....................................................... 711/122
(58) Field of Search ................................. 713/320, 324; 711/120, 122, 140

(56) References Cited

U.S. PATENT DOCUMENTS

| | | | |
|---|---|---|---|
| 4,899,275 A | 2/1990 | Sachs et al. ..................... | 711/3 |
| 5,179,675 A | 1/1993 | Cole et al. ....................... | 711/3 |
| 5,493,660 A | 2/1996 | DeLano et al. ............... | 711/206 |
| 5,577,225 A | 11/1996 | McClure ...................... | 711/118 |
| 5,745,729 A | 4/1998 | Greenley et al. ............ | 711/131 |
| 5,835,934 A | * 11/1998 | Tran ............................... | 711/3 |
| 5,918,245 A | 6/1999 | Yung ............................ | 711/122 |
| 5,956,752 A | 9/1999 | Mathews ..................... | 711/204 |
| 6,021,471 A | 2/2000 | Stiles et al. .................. | 711/140 |
| 6,138,208 A | * 10/2000 | Dhong et al. ............... | 711/122 |
| 6,226,713 B1 | 5/2001 | Mehrotra ..................... | 711/118 |
| 6,237,064 B1 | * 5/2001 | Kumar et al. ................ | 711/122 |
| 6,272,597 B1 | * 8/2001 | Fu et al. ....................... | 711/131 |
| 6,272,601 B1 | 8/2001 | Nunez et al. ................ | 711/140 |

* cited by examiner

Primary Examiner—David L. Robertson

(57) ABSTRACT

A system and method are disclosed which determine in parallel for multiple levels of a multi-level cache whether any one of such multiple levels is capable of satisfying a memory access request. Tags for multiple levels of a multi-level cache are accessed in parallel to determine whether the address for a memory access request is contained within any of the multiple levels. For instance, in a preferred embodiment, the tags for the first level of cache and the tags for the second level of cache are accessed in parallel. Also, additional levels of cache tags up to N levels may be accessed in parallel with the first-level cache tags. Thus, by the end of the access of the first-level cache tags it is known whether a memory access request can be satisfied by the first-level, second-level, or any additional N-levels of cache that are accessed in parallel. Additionally, in a preferred embodiment, the multi-level cache is arranged such that the data array of a level of cache is accessed only if it is determined that such level of cache is capable of satisfying a received memory access request. Additionally, in a preferred embodiment the multi-level cache is partitioned into N ways of associativity, and only a single way of a data array is accessed to satisfy a memory access request, thereby preserving the remaining ways of a data array to save power and resources that may be accessed to satisfy other instructions.

20 Claims, 2 Drawing Sheets

METHOD AND SYSTEM FOR EARLY TAG ACCESSES FOR LOWER-LEVEL CACHES IN PARALLEL WITH FIRST-LEVEL CACHE

BACKGROUND

Prior art cache designs for processors typically implement one or two level caches. More recently, multi-level caches having three or more levels have been designed in the prior art. Of course, it is desirable to have the cache implemented in a manner that allows the processor to access the cache in an efficient manner. That is, it is desirable to have the cache implemented in a manner such that the processor is capable of accessing the cache (i.e., reading from or writing to the cache) quickly so that the processor may be capable of executing instructions quickly and so that dependent instructions can receive data from cache as soon as possible.

An example of a prior art, multi-level cache design is shown in FIG. 1. The exemplary cache design of FIG. 1 has a three-level cache hierarchy, with the first level referred to as L0, the second level referred to as L1, and the third level referred to as L2. Accordingly, as used herein L0 refers to the first-level cache, L1 refers to the second-level cache, L2 refers to the third-level cache, and so on. It should be understood that prior art implementations of multi-level cache design may include more than three levels of cache, and prior art implementations having any number of cache levels are typically implemented in a serial manner as illustrated in FIG. 1. As discussed more fully hereafter, multi-level caches of the prior art are generally designed such that a processor accesses each level of cache in series until the desired address is found. For example, when an instruction requires access to an address, the processor typically accesses the first-level cache L0 to try to satisfy the address request (i.e., to try to locate the desired address). If the address is not found in L0, the processor then accesses the second-level cache L1 to try to satisfy the address request. If the address is not found in L1, the processor proceeds to access each successive level of cache in a serial manner until the requested address is found, and if the requested address is not found in any of the cache levels, the processor then sends a request to the system's main memory to try to satisfy the request.

Typically, when an instruction requires access to a particular address, a virtual address is provided from the processor to the cache system. As is well-known in the art, such virtual address typically contains an index field and a virtual page number field. The virtual address is input into a translation look-aside buffer ("TLB") 10 for the L0 cache. The TLB 10 provides a translation from a virtual address to a physical address. The virtual address index field is input into the L0 tag memory array(s) 12. As shown in FIG. 1, the L0 tag memory array 12 may be duplicated N times within the L0 cache for N "ways" of associativity. As used herein, the term "way" refers to a partition of the lower-level cache. For example, the lower-level cache of a system may be partitioned into any number of ways. Lower-level caches are commonly partitioned into four ways. As shown in FIG. 1, the virtual address index is also input into the L0 data array structure(s) (or "memory structure(s)") 14, which may also be duplicated N times for N ways of associativity. The L0 data array structure(s) 14 comprise the data stored within the L0 cache, which may be partitioned into several ways.

The L0 tag 12 outputs a physical address for each of the ways of associativity. That physical address is compared with the physical address output by the L0 TLB 10. These addresses are compared in compare circuit(s) 16, which may also be duplicated N times for N ways of associativity. The compare circuit(s) 16 generate a "hit" signal that indicates whether a match is made between the physical addresses. As used herein, a "hit" means that the data associated with the address being requested by an instruction is contained within a particular cache. As an example, suppose an instruction requests an address for a particular data labeled "A." The data label "A" would be contained within the tag (e.g., the L0 tag 12) for the particular cache (e.g., the L0 cache), if any, that contains that particular data. That is, the tag for a cache level, such as the L0 tag 12, represents the data that is residing in the data array for that cache level. Therefore, the compare circuitry, such as compare circuitry 16, basically determines whether the incoming request for data "A" matches the tag information contained within a particular cache level's tag (e.g., the L0 tag 12). If a match is made, indicating that the particular cache level contains the data labeled "A," then a hit is achieved for that particular cache level.

Typically, the compare circuit(s) 16 generate a single signal for each of the ways, resulting in N signals for N ways of associativity, wherein such signal indicates whether a hit was achieved for each way. The hit signals (i.e., "L0 way hits") are used to select the data from the L0 data array(s) 14, typically through multiplexer ("MUX") 18. As a result, MUX 18 provides the cache data from the L0 cache if a way hit is found in the L0 tags. If the signals generated from the compare circuitry 16 are all zeros, meaning that they are no hits, then "miss" logic 20 is used to generate a L0 cache miss signal. Such L0 cache miss signal then triggers control to send the memory instruction to the L1 instruction queue 22, which queues (or holds) memory instructions that are waiting to access the L1 cache. Accordingly, if it is determined that the desired address is not contained within the L0 cache, a request for the desired address is then made in a serial fashion to the L1 cache.

In turn, the L1 instruction queue 22 feeds the physical address index field for the desired address into the L1 tag(s) 24, which may be duplicated N times for N ways of associativity. The physical address index is also input to the L1 data array(s) 26, which may also be duplicated N times for N ways of associativity. The L1 tag(s) 24 output a physical address for each of the ways of associativity to the L1 compare circuit(s) 28. The L1 compare circuit(s) 28 compare the physical address output by L1 tag(s) 24 with the physical address output by the L1 instruction queue 22. The L1 compare circuit(s) 28 generate an L1 hit signal(s) for each of the ways of associativity indicating whether a match between the physical addresses was made for any of the ways of L1. Such L1 hit signals are used to select the data from the L1 data array(s) 26 utilizing MUX 30. That is, based on the L1 hit signals input to MUX 30, MUX 30 outputs the appropriate L1 cache data from L1 data array(s) 26 if a hit was found in the L1 tag(s) 24. If the L1 way hits generated from the L1 compare circuitry 28 are all zeros, indicating that there was no hit generated in the L1 cache, then a miss signal is generated from the "miss" logic 32. Such a L1 cache miss signal generates a request for the desired address to the L2 cache structure 34, which is typically implemented in a similar fashion as discussed above for the L1 cache. Accordingly, if it is determined that the desired address is not contained within the L1 cache, a request for the desired address is then made in a serial fashion to the L2 cache. In the prior art, additional levels of hierarchy may be added after the L2 cache, as desired, in a similar manner as discussed above for levels L0 through L2 (i.e., in a manner such that the processor accesses each level of the cache in series, until an address is found in one of the levels of cache). Finally, if a hit is not achieved in the last level of cache (e.g., L2 of FIG. 1), then the memory request is sent to the processor system bus to access the main memory of the system.

Multi-level cache designs of the prior art are problematic in that such designs require each level of cache to be accessed in series until a "hit" is achieved. That is, when an address is requested, each level of cache is accessed in series until the requested address is found within the cache (or it is determined that the requested address does not reside within cache, wherein a request for the address is then made to the system's main memory). Accordingly, if a requested address is residing in the L2 cache structure, the request must first be checked in the L0 cache, and then next in the L1 cache, in a serial manner, before it can begin the access into the L2 cache. Therefore, the more levels of cache implemented within a design generally increases the amount of time required to access a higher-level cache (e.g., the third-level cache L2 or higher) because of the serial nature of accessing each cache level one by one.

A further problem with prior art multi-level cache designs is that such prior art designs typically look up the tag and the data for a particular cache level in parallel in an attempt to improve the access time to that cache level. For example, in an attempt to improve the access time, a prior art implementation would typically perform a tag lookup for cache level L1 utilizing the L1 tag 24, while also looking up the desired data in L1 data array 26 in parallel. Accordingly, if the desired address is found in the L1 tag 24, the data from L1 data array 26 may be readily available because the lookup in the L1 data array 26 was performed in parallel with the tag lookup. However, with such prior art design, more of the data array (e.g., the L1 data array 26) is powered up than is necessary. For, example, assume that a four-way associative cache data structure is implemented. Prior art designs power up all four ways of the data array to lookup the desired data in parallel with performing the tag lookup. At best, only one of the four ways will need to be accessed for the desired address (assuming that the desired address is found within that level of cache), and possibly none of the four ways will need to be accessed for the desired address (if the desired address is not found within that level of cache). Accordingly, such prior art design wastes the power that is utilized to power up every way of a data array unnecessarily. Moreover, the resources of the data array are wasted in such prior art designs because each way of the data array is accessed without fully utilizing the resources of each way of the data array. That is, prior art designs typically access every way of a data array, thereby tying up the resources of every way of the data array (i.e., preventing those resources from being accessed by other instructions), while at best only utilizing one way of the data array and possibly not utilizing any of the ways of the data array (i.e., if the desired address is not found within that level of cache). Therefore, prior art designs tie up cache resources unnecessarily, thereby wasting resources that may potentially be used to satisfy other instructions.

Additionally, certain instructions encountered within a system only need to access the tags of the cache, without requiring access to the cache's data array. For example, snoops off of a system bus need to access the tags to find out if a certain cache line is resident in any of the levels of cache. As used herein a "snoop" is an inquiry from a first processor to a second processor as to whether a particular cache address is found within the second processor. A high percentage of the time, the tag access for a snoop will indicate that the cache line is not present, so no data access is necessary. However, as discussed above, prior art cache designs are typically implemented such that the cache data array is accessed in parallel with the tag lookup. Therefore, a snoop access of the tag typically wastes the resources of the data array because most of the time access to the data array is not needed. Furthermore, system bus snoops generally require a very quick response. Accordingly, the serial access design of prior art caches may result in a greater response time than is required by the system for responding to a snoop. Therefore, the multi-level cache designs of the prior art may negatively impact the time required to satisfy requests, such as snoop requests, that only require access to the cache's tags.

SUMMARY OF THE INVENTION

In view of the above a desire exists for a cache design that allows for upper-level caches (e.g., level two or higher) to be accessed in a timely manner. A further desire exists for a cache design that does not unnecessarily access the cache's data array, thus not wasting power or resources of the data array. Yet a further desire exists for a cache design that performs requests that require access only to the cache's tags, such as snoops, in a timely manner and in a manner that does not unnecessarily waste power or resources of the cache's data array.

These and other objects, features and technical advantges are achieved by a system and method which determine in parallel for multiple-levels of a multi-level cache whether any one of such multiple levels is capable of satisfying a memory access request. That is tags for multiple levels of a multi-level cache are accessed in parallel to determine whether the address for a memory access request is contained within any of the tiple levels. Thus, the tag accesses for multiple levels of a multi-level cache are performed early in the pipeline of the cache hierarchy to provide an early lookup of the tags. For instance, in a preferred embodiment the tags for the first level of cache and the tags for the second level of cache are accessed in parallel. Also, additional levels of cache tags up to N levels may be accessed in parallel with the first-level cache tags. As a result, as tags for the first-level cache are being accessed, tags for other levels of the cache are being accessed in parallel, such that by the end of the access of the first-level cache tags it is known whether a memory access request can be satisfied by the first-level, second-level, and any additional N-levels of cache that are accessed in parallel.

Additionally, in a preferred embodiment, the multi-level cache is arranged such that the data array of a level of cache is accessed only if it is determined that such level of cache is needed to satisfy a received memory access request. Accordingly, in a preferred embodiment, the data arrays of the multi-level cache are not unnecessarily accessed. For instance, in a preferred embodiment, the tag access is performed separate from the data array access for a level of cache, and the data array for that level of cache is not accessed if a hit is not achieved within that level's tags (i.e., the data is not present in that level of the cache). This has the advantage of saving power because the data arrays are not powered up unnecessarily. That is, unused memory banks (or data arrays) may not be powered up in a preferred embodiment, thereby reducing power consumption. Of course, in alternative embodiments, the unused memory banks may still be powered up, and any such embodiment is intended to be within the scope of the present invention. Also, it results in preserving the data array resources so that they may be used by other instructions, rather than unnecessarily wasting them by accessing them when the data is not present in that level of cache. Also, requests that require access only to the cache tags, such as snoop requests, do not cause the data array resources to be accessed because the tag access is separated from the data array access, in a preferred embodiment. Accordingly, in a preferred embodiment, requests that require access only to the cache's tags are performed in a timely manner and in a manner that preserves power and data array resources because the cache is implemented such that an access to the data array is not performed for such requests.

Additionally, in a preferred embodiment the multi-level cache is partitioned into N ways of associativity. Most preferably, the multi-level cache is partitioned into four ways. In a preferred embodiment, only a single way of a data array is accessed to satisfy a memory access request. That is, in a preferred embodiment, the cache tags for a level of cache are accessed to determine whether a requested memory address is found within a level of cache before such level's data array is accessed. Accordingly, when the data array for a level of cache is accessed, it is known in which way the desired data is residing. Therefore, only the one data array way in which the data resides is powered up and accessed to satisfy the access request. Because the other ways of the data array that are not capable of satisfying the request are not accessed, a saving in power and data array resources may be recognized.

In a most preferred embodiment, the multi-level cache may be implemented to allow maximum utilization of the cache data arrays. As discussed above, in a preferred embodiment, cache data arrays are not accessed unnecessarily. Accordingly, in a preferred embodiment, cache data arrays that are not capable of satisfying one request remain free to be accessed for another request. In a most preferred embodiment, the multi-level cache may be implemented such that multiple instructions may be satisfied by the cache data arrays in parallel. That is, the resources that remain free may be utilized to satisfy other memory access requests in an efficient manner.

It should be understood that in a preferred embodiment a multi-level cache structure is provided that is capable of receiving and satisfying any type of access request from an instruction, including a read request, write request, and read-modify-write request. It should be appreciated that a technical advantage of one aspect of the present invention is that a multi-level cache structure is implemented to allow for multiple levels of cache tags to be accessed in parallel, thereby allowing a determination to be made quickly and efficiently as to whether a memory access request can be satisfied by any one of such multiple levels of cache. By implementing the tag access of upper-level caches (e.g., level two or higher) early in the pipeline, fast access to higher-level cache or beyond cache (e.g., access to main memory) is achieved. A further technical advantage of one aspect of the present invention is that a multi-level cache design of a preferred embodiment does not unnecessarily access the cache's data array, thus preserving power and resources of the data array. Yet a further technical advantage of one aspect of the present invention is that a multi-level cache design of a preferred embodiment performs requests that require access only to the cache's tags, such as snoops, in a timely manner and in a manner that does not unnecessarily waste power or resources of the cache's data array.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
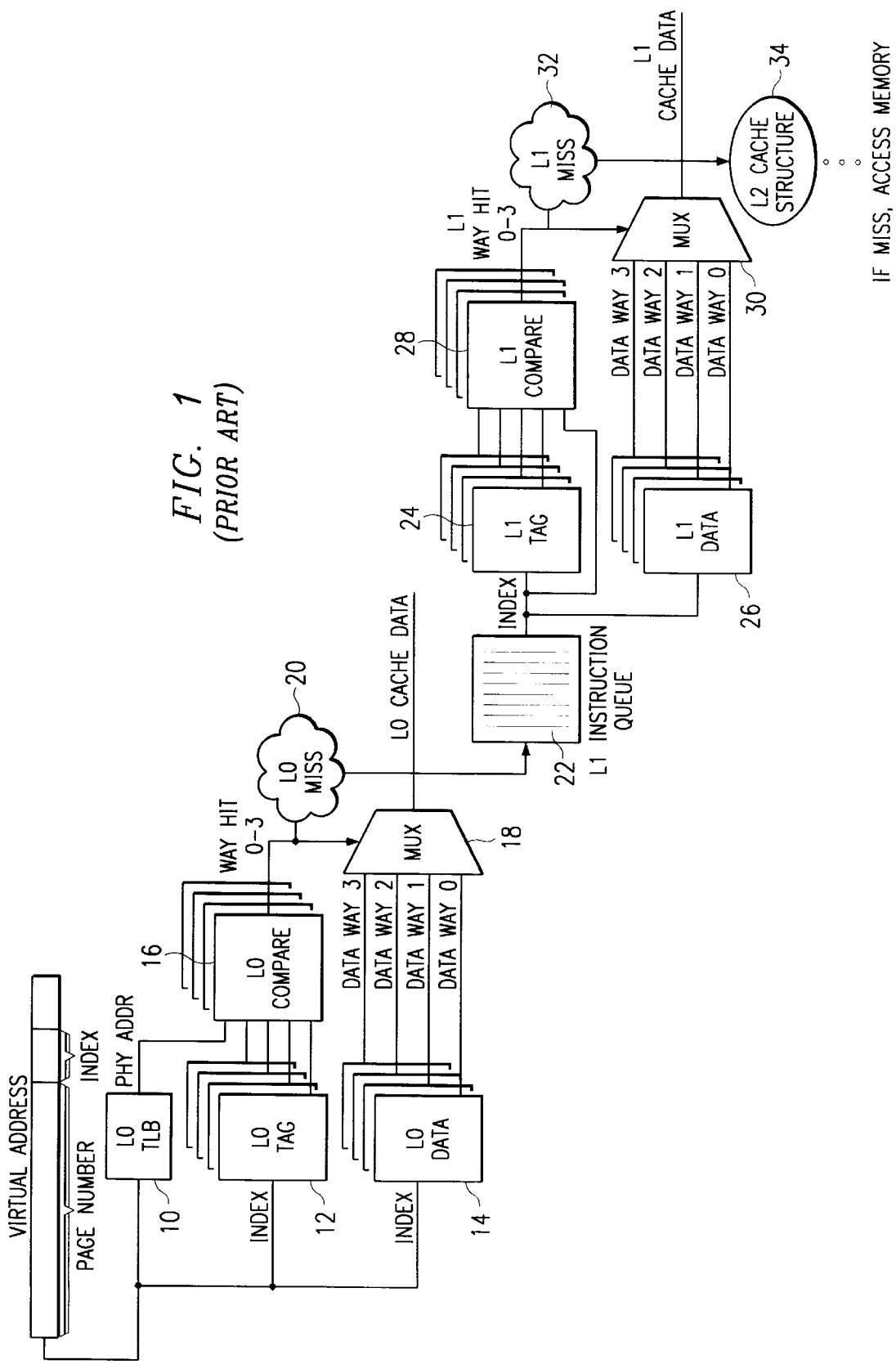
FIG. 1 shows an exemplary multi-level cache design of the prior art.
Figure 2:
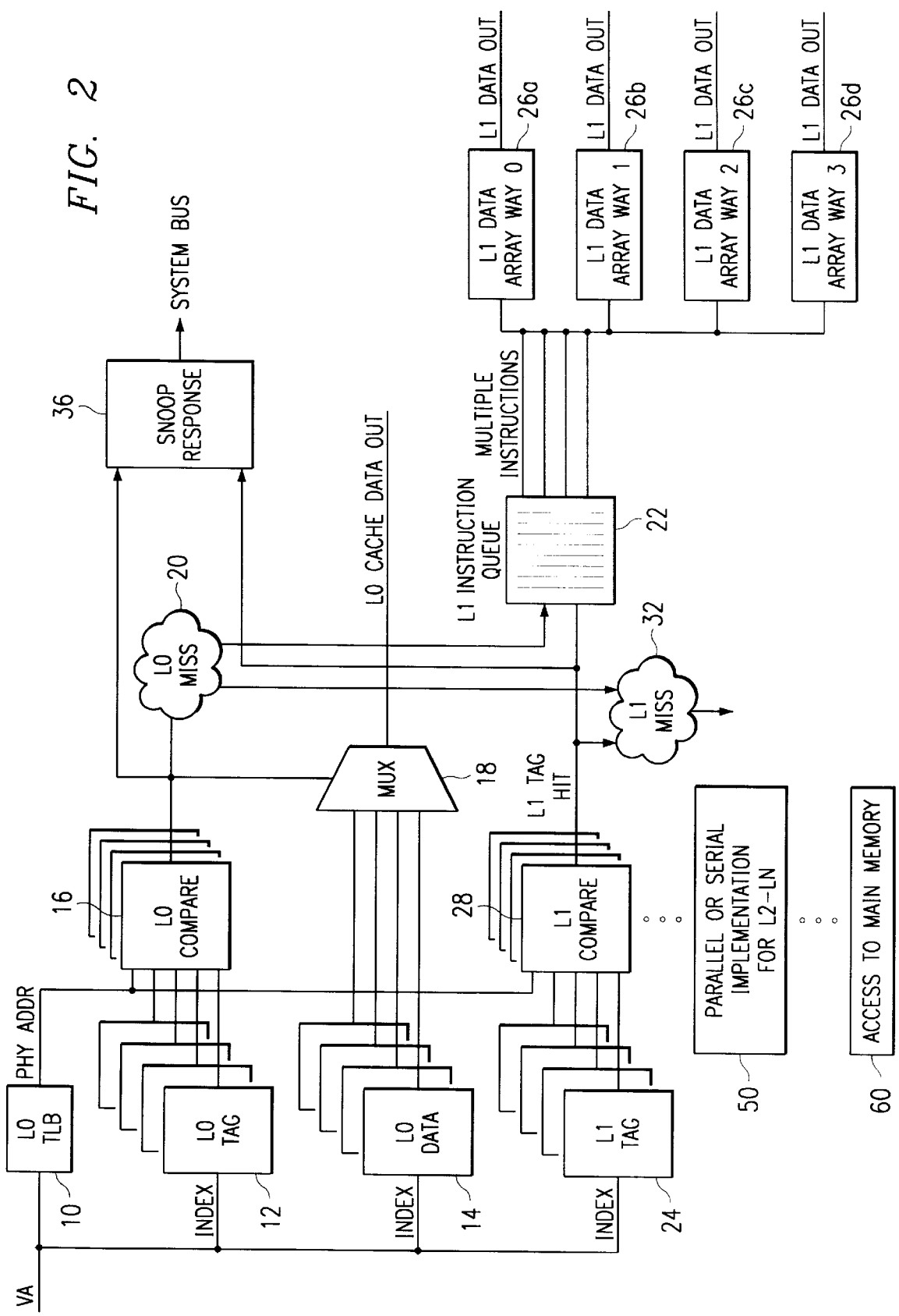
FIG. 2 shows a preferred embodiment for a multi-level cache design of the present invention.

Turning to FIG. 2, a preferred embodiment of the present invention is shown. In a preferred embodiment, the first level cache structure L0 is implemented in a manner as described for the prior art L0 cache of FIG. 1. More specifically, when an instruction requires access to a particular address, a virtual address is provided from the processor to the cache system. Such virtual address typically contains an index field and a virtual page number field. Most preferably, the virtual address is input into TLB 10 for the L0 cache. Even though a preferred embodiment includes TLB 10 to translate a virtual address to a physical address, it should be understood that such a TLB implementation is not necessary to the present invention. Thus, while it is most preferable to implement the cache structure with a TLB 10, in alternative embodiments the cache may be implemented without such a TLB 10. For example, the cache structure may receive physical addresses rather than virtual addresses for memory access requests (and therefore not require a TLB), or the cache may be implemented in a manner to access the memory using virtual addresses received without requiring a translation of such virtual addresses to physical addresses. Furthermore, a structure other than a TLB 10 may be utilized to translate a received virtual address to a physical address.

In a preferred embodiment, the TLB 10 provides a translation from a virtual address to a physical address. The virtual address index field is input into the L0 tag memory array(s) 12. As shown in FIG. 2, the L0 tag memory array 12 may be duplicated N times within the L0 cache for N "ways" of associativity. It should be understood that in a preferred embodiment the lower-level cache of a system may be partitioned into any number of ways. In a most preferred embodiment, the lower-level caches are partitioned into four ways. As shown in FIG. 2, the virtual address index is also input into the L0 data array structure(s) (or "memory structure(s)") 14, which may also be duplicated N times for N ways of associativity. It should be understood that the L0 data array structure(s) 14 comprise the data stored within the L0 cache, which may be partitioned into several ways.

The L0 tag 12 outputs a physical address for each of the ways of associativity. That physical address is compared with the physical address output by the L0 TLB 10 utilizing compare circuit(s) 16, which may also be duplicated N times for N ways of associativity. As discussed in conjunction with FIG. 1, the compare circuit(s) 16 generate a "hit" signal that indicates whether a match is made between the physical addresses. Most preferably, the compare circuit(s) 16 generate a single signal for each of the ways, resulting in N signals for N ways of associativity, wherein such signal indicates whether a hit was achieved for each way. The hit signals (i.e., "L0 way hits") are used to select the data from the L0 data array(s) 14, most preferably through a multiplexer ("MUX") 18. As a result, in a preferred embodiment, MUX 18 provides the cache data from the L0 cache if a way hit is found in the L0 tags. However, if the signals generated from the compare circuitry 16 are all zeros, meaning that they are no hits, then "miss" logic 20 is used to generate a L0 cache miss signal, in a preferred embodiment.

In a preferred embodiment, the L1 tag memory array 24 is implemented early in the pipeline and in parallel with the first-level cache access. The L1 tag memory array 24 is accessed having the index from the virtual address input thereto, and L1 tag memory array 24 outputs a physical address, which is used by compare circuitry (comparator) 28 to compare the physical address generated from TLB 10 with the outputs of the L1 tag memory array 24. As a result, an early L1 tag hit signal is generated in parallel with the first-level cache access. Accordingly, in a preferred embodiment, a hit signal is generated for both the L0 tag 12 and the L1 tag 24 in parallel. As shown in FIG. 2, if a hit is achieved in L1, then the request may be scheduled in the L1 instruction queue 22 to be satisfied by the L1 data array 26.

In a preferred embodiment, if a hit is achieved in the L0 cache, then the request is satisfied by the L0 data array 14, and such request is not scheduled in the L1 instruction queue 22. For instance, in a preferred embodiment, the output of miss logic 20 for the L0 cache is combined with the L1 hit signal output by compare circuitry 28, such that only if a miss is indicated for the L0 cache and a hit is achieved by the L1 cache is the request inserted in the L1 instruction queue 22. Thus, a signal from miss logic 20 indicating that no hit was achieved in the L0 cache triggers control to send the memory instruction to the L1 instruction queue 22 if a hit is achieved in the L1 tag 24, as indicated by the output of compare circuitry 28. Thus, in a preferred embodiment, if no way hit is achieved in the L0 cache, but a way hit is achieved in the L1 tag(s) 24, then the request is loaded into the L1 instruction queue 22 to access the L1 data array(s) 26.

In view of the above, in a preferred embodiment, the L1 data array(s) 26 are only accessed if a hit is achieved within the L1 tag(s) 24. It should be understood, however, that alternative embodiments may be implemented such that the L1 data array(s) 26 are accessed in parallel with the L1 tag(s) 24, and any such implementation is intended to be within the scope of the present invention. For example, in an alternative embodiment, the L0 tag(s) 12 and L1 tag(s) 24 may be accessed in parallel with each other, and the L0 data array(s) 14 may be accessed in parallel with the L0 tag(s) 12 and the L1 data array(s) 26 may be accessed in parallel with the L1 tag(s) 24.

As discussed above, in a preferred embodiment, a memory access request is scheduled in the L1 instruction queue 22 only after a determination has been made that a hit has been achieved in the L1 tag(s) 24. Additionally, in a preferred embodiment, information indicating the specific way to be accessed is included with a request scheduled in instruction queue 22 (i.e., the specific way for which a hit was achieved). That is, because the compare circuitry 28 determines if a hit has been achieved for the L1 tag(s) 24 before the request is scheduled in L1 queue 22, the requests scheduled in L1 queue 22 may include information specifying the way for which a hit was achieved. As a result, the L1 instruction queue 22 issues the request to only the one data array 26 that needs to be accessed to satisfy the request, in a preferred embodiment. Thus, as shown in FIG. 2, if a hit is achieved within L1 tag(s) 24 for a requested address, then only one of the data arrays 26A–26D is accessed to satisfy the request. Accordingly, the remaining data arrays may be used to satisfy other instructions or may be powered down to save power on the processor. Thus, in a preferred embodiment, the L1 instruction queue is provided information indicating the particular way of the data array that is needed to satisfy an instruction, which enables the instruction queue to issue instructions to the four data array structures 26A through 26D in an efficient manner. For example, suppose a first instruction requires access to L1 data array way 0 (shown as 26A in FIG. 2) and a second instruction requires access to L1 data array way 1 (shown as 26B in FIG. 2). In a preferred embodiment, the first and second instructions could be issued in parallel with each other by the L1 instruction queue 22. Thus, it would be possible for N instructions to access N ways of a cache level's data array in parallel.

It will be recalled that prior art cache designs typically required an access to all ways of the data array, wherein only one of the ways, at best, was utilized to satisfy the request. Accordingly, a preferred embodiment provides a much more effective use of the cache resources by only powering up and accessing the data array way necessary to satisfy the request, leaving the remaining data array ways free to be powered down or accessed in parallel to satisfy other requests. Thus, in a preferred embodiment, while a data array of a first way is being utilized to satisfy a first request, one or more of the remaining data array ways may be utilized to satisfy a second request, thereby satisfying the second request more efficiently than if such second request were required to wait until after the first request had completed its access to the first way, as is typically required in prior art designs.

In view of the above, in a preferred embodiment, information is provided to enable only the data array way that is capable of satisfying the request to be accessed. It should be understood, however, that alternative embodiments may be implemented such that all ways of the data array for a level of cache for which a hit was achieved are accessed (e.g., all of data array(s) 26A through 26D), and any such implementation is intended to be within the scope of the present invention. For example, in an alternative embodiment, the L0 tag(s) 12 and L1 tag(s) 24 may be accessed in parallel with each other, and if a hit is achieved for the L1 tag(s), all of the L1 data array(s) 26A through 26D may be accessed in an attempt to satisfy the request.

As discussed above, in a preferred embodiment, the signals output from the compare circuitry 28 are combined with the output signals of the miss logic 20 of the L0 cache. If the signals generated from the compare circuitry 28 are all zeros, meaning that they are not hits, and the signals generated from the miss logic 20 indicate that no hit is achieved for the L0 cache, then the request cannot be satisfied by either the L0 or the L1 cache. Accordingly, in such case the request is not scheduled in the L1 instruction queue 22, which prevents an unnecessary access to the L1 data array(s) 26. Additionally, when no hit is made in either the L0 or the L1 cache, "miss" logic 32 is used to generate a L1 cache miss signal, in a preferred embodiment, which triggers control to send the request to the next sequential level of cache 50 or, if no further level of cache is present, to the system's main memory 60.

Accordingly, by implementing the access of the L1 tag 24 early in the pipeline to allow access to the L1 tag 24 in parallel with access to the L0 tag 12, faster access of the L2 cache is achieved, if necessary. That is, rather than accessing the L0 and L1 tags in series, as typically performed in the prior art, the L0 and L1 tags are accessed in parallel, resulting in faster access to the higher, L2 cache level if the request cannot be satisfied by the lower L0 or L1 cache levels. Of course, it should be understood that any number of lower cache levels may be implemented in such a parallel fashion to allow faster access to a higher cache level, and any such implementation is intended to be within the scope of the present invention. For example, cache levels L0, L1, and L2 may all be implemented in a parallel fashion, wherein the tags for each of such cache levels are accessed in parallel in an attempt to satisfy a request. Furthermore, higher-level caches may be implemented in a serial manner, such that the lower-level caches may be accessed in parallel and then higher-level caches accessed in a serial manner, and any such implementation is intended to be within the scope of the present invention. Accordingly, block 50 of FIG. 2 represents any additional levels of cache (e.g., cache levels L2 through LN) that may be implemented within the cache design in either a parallel or serial manner. Of course, if a hit is not achieved within any of the cache levels, then a request may be made to the system's main memory 60 to satisfy the memory access request of an instruction.

In view of the above, in a preferred embodiment, the cache is implemented such that access is made to the lower-level cache tags in parallel (e.g., accessing L0 tag 12 and L1 tag 24 in parallel). For instance, access is made to the first-level cache tags 12 in parallel with one or more higher-level cache tags (e.g., L1 tag 24). Also, in a preferred embodiment, the cache is implemented such that if a hit is achieved for the first-level cache, then the request is satisfied by the L0 cache data array 14 and the request is not scheduled in any higher-level instruction queue (e.g., the L1 instruction queue 22). However, if a hit is not achieved for the first-level cache and a hit is achieved for a higher-level cache (e.g., the L1 cache), then the request is scheduled in such higher-level cache's instruction queue (e.g., the L1 instruction queue 22). Moreover, if a hit is not achieved for either the first-level cache or a higher-level cache (e.g., the L1 cache) that is accessed in parallel with the first-level cache, then a request is not scheduled in an instruction queue for any of such higher-level caches, and a request is made to the next sequential level of cache (or to the system's main memory if no further levels of cache exist).

Additionally, in a preferred embodiment, instructions or activities that only require a tag access, such as a snoop request, do not cause a data access. For example, a snoop request maybe received by the cache structure of a first processor from the system bus from a second processor requesting whether a particular cache line is present within the first processor's cache. Such a snoop request may cause a physical or virtual address representing the desired address to be input to the cache system. In a preferred embodiment, that address is sent to the L0 tag, as well as the L1 tag in parallel. One advantage of accessing the first-level and second-level caches at the same time is that the compare results output by logic 16 and 28 may be sent to a snoop response block 36, which then provides the result of whether the desired address is found within L0 or L1 of the processor's cache. Thus, a preferred embodiment provides a faster snoop response to the system bus than a cache implementation that requires an access of the L0 cache first and then the L1 cache in a serial manner. As a result, the snoop response may be achieved in a timely manner as a result of a parallel access of multiple levels of cache tags.

Even though a preferred embodiment has been shown and described herein as enabling parallel access to the first-level and second-level cache tags, it should be understood that the cache may be implemented such that any number of levels of cache tags may be accessed in parallel, and any such implementation is intended to be within the scope of the present invention. Furthermore, while multiple levels of cache tags are accessed in parallel in a preferred embodiment, the cache may be implemented such that other levels of cache are accessed in a serial manner (as in prior art implementations), and any such implementation is intended to be within the scope of the present invention. For instance, the first two levels of cache tags may be accessed in parallel, and if a hit is not achieved therein, access may be made to a third level of cache in a serial fashion.

It should also be understood that a preferred embodiment may be implemented for a cache having any number of ports. That is, any number of ports may be implemented within the cache levels. For example, the cache structure may be implemented as a four-ported cache, wherein four accesses are made to the L0 cache tags and four are made to the L1 cache tags in parallel (simultaneously). Thus, the cache may be implemented having a single port up to any number of ports. Also, the cache may be implemented such that the number of ports differs for the various levels of cache. For example, a first-level cache may be implemented having two ports and two accesses per cycle, and a second-level cache may be implemented to support four ports and four accesses per cycle.

It should be understood that in a preferred embodiment the cache structure is capable of receiving and satisfying any type of access request from an instruction, including a read request, write request, and read-modify-write request. It should also be understood that although a preferred embodiment has been described herein as including a TLB to translate a virtual address to a physical address, such a TLB implementation is not necessary to the invention. Thus, while it is most preferable to implement the cache with a TLB, the cache may be implemented without having such a TLB. For example, the cache may receive physical addresses for a memory access request (and therefore not require a TLB), the cache may be implemented in a manner to receive virtual addresses without requiring a TLB to translate such virtual addresses to a physical address, or a structure other than a TLB may be utilized to translate a virtual address to a physical address. Thus, the scope of the present invention is intended to encompass a cache implementation with or without a TLB. It should further be understood that a cache structure of the present invention may be implemented within any type of computer system having a processor, including but not limited to a personal computer (PC), laptop computer, and personal data assistant (e.g., a palmtop PC). It should further be understood that a cache structure of the present invention may be implemented for a network processor, such as a network processor that is implemented for Internet, Intranet, or other network applications.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of accessing a multi-level cache, said method comprising:

reciving a memory access request into a multi-level cache structure;

determining if said memory access request can be satisfied by a level of said multi-level cache structure, wherein said determining is performed in parallel for multiple levels of said multi-level cache structure; and if determined that said memory access request can be satisfied by a level of said multi-level cache structure, then satisfying said memory access request by said level of said multi-level cache structure.

2. The method of claim 1, wherein said determining if said memory access request can be satisfied by a level of said multi-level cache structure further comprises:

determining whether a memory address requested to be accessed is included within a level of said multi-level cache structure.

3. The method of claim 1, further comprising:

accessing a data array of a level of cache only if it is determined that such level of cache is capable of satisfying said memory access request.

4. The method of claim 3, further comprising:

powering up said data array only if it is determined that said data array is capable of satisfying said memory access request.

5. The method of claim 1, wherein said multi-level cache is partitioned into multiple ways.

6. The method of claim 5, further comprising:

accessing only a single way of a data array for a level of cache that has been determined to be capable of satisfying said memory access request.

7. The method of claim 6, further comprising:

accessing, in parallel with accessing said single way, a second way of said data array for said level of cache that has been determined to be capable of satisfying a second memory access request.

8. The method of claim 1, further comprising:

detmining if said memory access request can be satisfied by a level of said multi-level cache structure for at least one level of cache in series with another level of said multi-level cache.

9. The method of claim 1, wherein said determining if said memory access request can be satisfied by a level of said multi-level cache further comprises:

determining if said memory access request can be satisfied by a first level of said multi-level cache structure and determining if said memory access request can be satisfied by a second level of cache in parallel with said determining for said first level; and queuing said memory access request for a data array of said second level only if it is determined that said first level cannot satisfy said memory access request and determined that said second level can satisfy said memory access request.

10. The method of claim 1, wherein said memory access request is a request that only requires access to tags of a level of said cache, further comprising:

accessing said tags of said level of said cache without accessing a data array of said level of said cache to satisfy said memory access request.

11. The method of claim 10, wherein said memory access request is a snoop request.

12. A computer system comprising:

a processor that executes instructions; and a multi-level cache structure accessible by said processor to satisfy memory access requests, wherein said multi-level cache structure is configured to receive a memory access request and determine in parallel for multiple levels of said multi-level cache structure whether one of said multiple levels is capable of satisfying said received memory access request.

13. The computer system of claim 12, wherein said multi-level cache structure comprises:

a TLB that receives a virtual address for said memory access request and outputs a corresponding physical address.

14. The computer system of claim 13, wherein said multi-level cache structure further comprises:

a tag memory array for a first cache level that receives a virtual address index and outputs a corresponding physical address; and a tag memory array for a second cache level that receives a virtual address index and outputs a corresponding physical address.

15. The computer system of claim 14, wherein said multi-level cache structure further comprises:

first compare circuitry that compares the physical address output by said TLB with the physical address output by said tag memory array for said first cache level to determine if a match is achieved for said first level of cache; and second compare circuitry that compares the physical address output by said TLB with the physical address output by said tag memory array for said second cache level to determine if a match is achieved for said second level of cache, wherein said first compare circuitry and said second compare circuitry determine in parallel whether a match is achieved for either of said first level of cache or said second level of cache.

16. The computer system of claim 12, wherein said multi-level cache structure further comprises:

a data array structure for each level of said multi-level cache, wherein a data array structure for a particular level of said multi-level cache is capable of being accessed to satisfy said memory access request if said multi-level cache determines that said particular level of cache is capable of satisfying said memory access request.

17. A multi-level cache structure that is accessible to a processor to satisfy memory access requests for instructions being executed by said processor, said cache structure comprising:

a means for receiving a memory access request from a processor; and a means for determining whether a level of said multi-level cache structure is capable of satisfying a received memory access request, wherein said means for determining is configured to determine in parallel for multiple levels of said multi-level cache structure whether one of said multiple levels is capable of satisfying said received memory access request.

18. The multi-level cache structure of claim 17, wherein said means for receiving a memory access includes a TLB that receives a virtual address and outputs a corresponding physical address.

19. The multi-level cache structure of claim 18, wherein said means for receiving a memory access includes a tag memory array for a first cache level that receives a virtual address index and outputs a corresponding physical address and a tag memory array for a second cache level that receives a virtual address index and outputs a corresponding physical address.

20. The multi-level cache structure of claim 19, wherein said means for determining whether a level of said multi-level cache structure is capable of satisfying a received memory access request includes:

first compare circuitry that compares the physical address output by said TLB with the physical address output by said tag memory array to determine if a match is achieved for said first level of cache; and second compare circuitry that compares the physical address output by said TLB with the physical address output by said tag memory array to determine if a match is achieved for said second level of cache, wherein said first compare circuitry and said second compare circuitry determine in parallel whether a match is achieved for either of said first level of cache or said second level of cache.

* * * * *